(12) United States Patent
Marengo

(10) Patent No.: US 10,868,426 B1
(45) Date of Patent: Dec. 15, 2020

(54) EXPLOITATION OF ELECTRICAL POWER PRODUCED BY A HOUSEHOLD PHOTOVOLTAIC SYSTEM TO ELECTRICALLY POWER REMOTELY ELECTRONICALLY-CONTROLLABLE ELECTRIC HOUSEHOLD APPLIANCES

(71) Applicant: ALBASOLAR S.r.l., Alba (IT)

(72) Inventor: Massimo Marengo, Alba (IT)

(73) Assignee: ALBASOLAR S.R.L.

( * ) Notice: Subject to any disclaimer, the term of this patent is extended or adjusted under 35 U.S.C. 154(b) by 0 days.

(21) Appl. No.: 16/574,630

(22) Filed: Sep. 18, 2019

(51) Int. Cl.
*H02J 3/38* (2006.01)
*H02J 13/00* (2006.01)
*H02J 3/14* (2006.01)
*G05B 15/02* (2006.01)

(52) U.S. Cl.
CPC .............. *H02J 3/383* (2013.01); *G05B 15/02* (2013.01); *H02J 3/14* (2013.01); *H02J 13/0096* (2013.01); *H02J 2310/14* (2020.01)

(58) Field of Classification Search
CPC .... H02J 3/383; H02J 3/38; H02J 13/00; H02J 13/14; H02J 13/0096; H02J 310/14; G05B 15/02
See application file for complete search history.

(56) References Cited

U.S. PATENT DOCUMENTS

2016/0164299 A1   6/2016   Becattini et al.

FOREIGN PATENT DOCUMENTS

CN   103105528   5/2013

OTHER PUBLICATIONS

European Search Report from EP Application No. 18215975, dated Mar. 27, 2019, pp. 1-5.
Italian Search Report from IT Application No. 201800003898, dated Aug. 24, 2018, pp. 1-7.

*Primary Examiner* — Robert L Deberadinis
(74) *Attorney, Agent, or Firm* — The Belles Group, P.C.

(57) ABSTRACT

An electronic control system to control exploitation of electrical power produced by a household photovoltaic system to electrically power remotely electronically-controllable electric household appliances. The household photovoltaic system is electrically connected to a public electrical power mains and to a household electric system via an electronic electrical power meter configured to measure the electrical power produced by the household photovoltaic system and the electrical power absorbed from or supplied to the public electrical power mains as a result of an electrical power underproduction or overproduction of the household photovoltaic system compared to the electric power consumption of the household electric system. The electronic control system comprises an electronic control unit provided with a user programming interface and configured to communicate with the electronic electrical power meter to determine an excess of electrical power produced by the photovoltaic system over the electric power consumption of the household electric system.

8 Claims, 1 Drawing Sheet

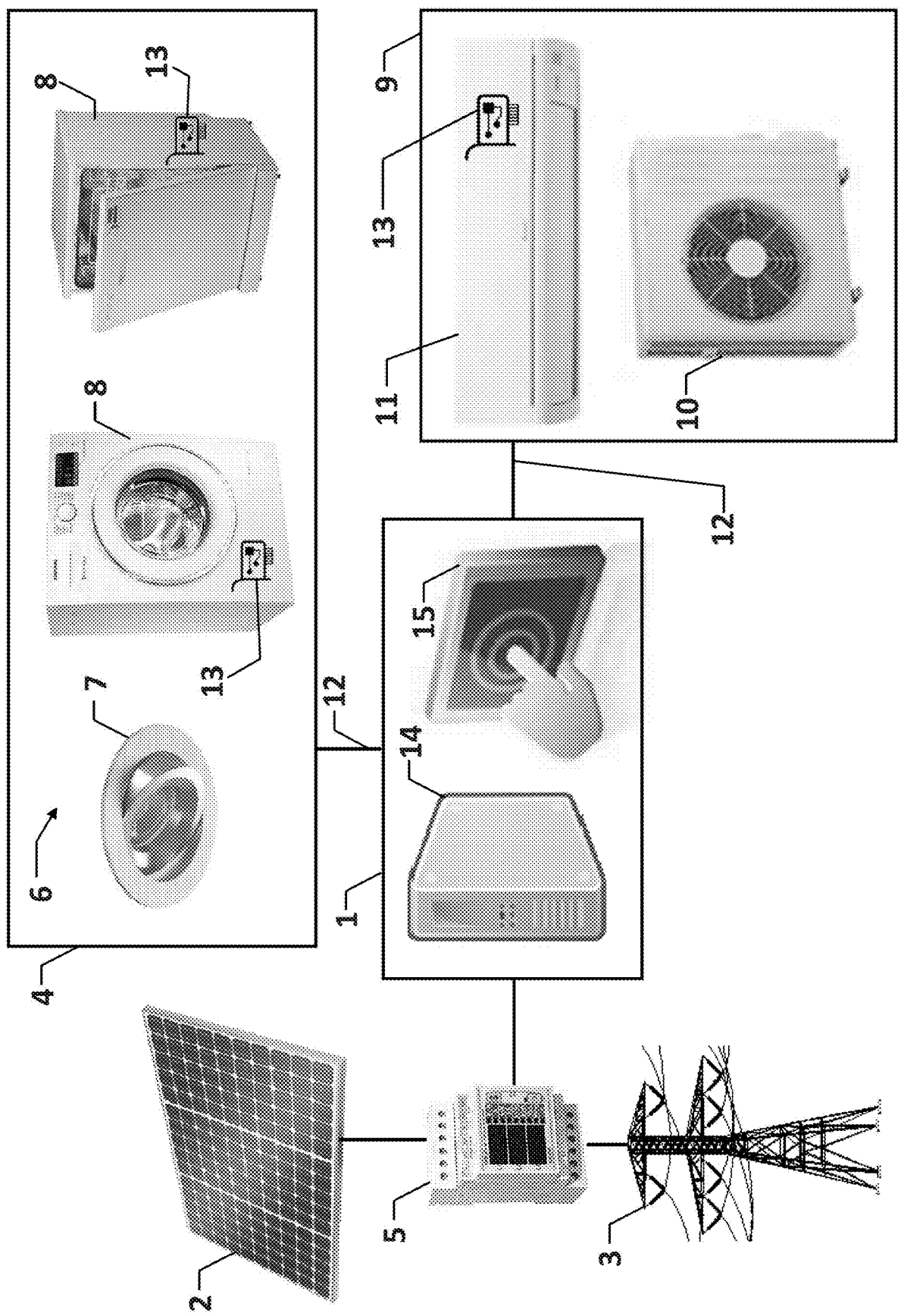

EXPLOITATION OF ELECTRICAL POWER PRODUCED BY A HOUSEHOLD PHOTOVOLTAIC SYSTEM TO ELECTRICALLY POWER REMOTELY ELECTRONICALLY-CONTROLLABLE ELECTRIC HOUSEHOLD APPLIANCES

TECHNICAL FIELD OF THE INVENTION

The present invention relates to the exploitation of the electrical power produced by a household photovoltaic system to electrically power remotely electronically-controllable electric household appliances.

STATE OF THE ART

US 2016/164299 A1 discloses an apparatus for the conversion and optimized management of power produced from renewable sources, and in particular from solar sources, in the household environment and not only, adapted to control the use of power in order to maximize the management cost-effectiveness whilst ensuring the optimization of the energy collection by the photovoltaic generator.

OBJECT AND SUMMARY OF THE INVENTION

The object of the present invention is to provide logics that allow to maximize the exploitation of the electrical power produced by the household photovoltaic systems to electrically power remotely electronically-controllable electric household appliances.

This object is achieved by the present invention, which relates to an electronic control system to control exploitation of electrical power produced by a household photovoltaic system to electrically power remotely electronically-controllable electric household appliances.

BRIEF DESCRIPTION OF THE DRAWINGS

The attached FIGURE shows a block diagram of an electronic control system to control exploitation of electrical power produced by a household photovoltaic system according to an embodiment of the present invention.

DETAILED DESCRIPTION OF A PREFERRED EMBODIMENT OF THE INVENTION

The following description is provided to allow a person skilled in the art to implement and use the invention. Various modifications to the disclosed embodiments will be immediately apparent to a person skilled in the art and the generic principles disclosed herein may be applied to other embodiments and applications without, thereby, departing from the scope of the present invention as claimed in the appended claims. Therefore, the present invention must not be considered as limited to the embodiments disclosed and shown, but must be granted the widest scope consistent with the principles and features disclosed herein and claimed in the appended claims.

The attached FIGURE shows a block diagram of an electronic control system 1 to control exploitation of electrical power produced by a household photovoltaic system 2.

The household photovoltaic system 2 is electrically connected to a public electrical power mains 3 and to a household electric system 4 through an electronic electrical power meter 5 configured to measure the electrical power produced by the household photovoltaic system 2 and the electrical power absorbed from or supplied to the public electrical power mains 3 as a result of an electrical power underproduction or overproduction of the household photovoltaic system 2 compared to the electrical power consumption of the household electric system 4.

The household electric system 4 comprises a plurality of household electric loads 6 comprising, inter alia, internal and external light sources 7, electric household appliances 8, an electrically powered hot/cold air/air heat pump system 9 comprising one or more outdoor units 10 and one or more indoor units 11, also known as splits, etc.

The electric household appliances 8 and the indoor units 11 of the hot/cold air/air heat pump system 9 are remotely electronically controllable via a household signal communication system 12 which, according to the specific environmental and operating conditions in which it is installed, can be completely wired, completely wireless or a combination of the two.

In one embodiment, the household signal communication system 12 could, for example, be a powerline communication system.

In a different embodiment, to which the following description will refer without thereby losing generality, the household signal communication system 12 is a household computer communication network which, according to the specific environmental and operational conditions in which it is installed, can be a based on a TCP/IP communication protocol or on a communication protocol other than TCP/IP, for example the Modbus protocol.

In the case where the household computer communication network is based on a TCP/IP communication protocol, it can be a wired Local Area Network (LAN), a Wireless Local Area Network (WLAN) or a mixed LAN/WLAN network. Therefore, the electric household appliances 8 and the indoor units 11 of the hot/cold air/air heat pump system 9 can be remotely electronically controlled by means of fully wired connections, in particular by means of fieldbus, fully wireless connections, in particular radio, or mixed connections partly wired and partly wireless.

Furthermore, the electric household appliances 8 and of the indoor units 11 of the hot/cold air/air heat pump system 9 can be remotely electronically controlled via a direct communication, namely entirely internal to the household environment in which the household computer communication network 12 is installed, or via an indirect communication, namely a communication that is partly external to the household environment in which the household computer communication network 12 is installed, e.g., through cloud services provided by the manufacturers of electric household appliances 8 and of the indoor units 11 of the hot/cold air/air heat pump system 9.

If the electric household appliances 8 and the indoor units 11 of the hot/cold air/air heat pump system 9 fail to expose connection capabilities to establish a connection to the household computer communication network 12, the electric household appliances 8 and the indoor units 11 of the hot/cold air/air heat pump 9 can be provided with appropriate boards or network interfaces 13 configured to allow the electric household appliances 8 and the indoor units 11 of the hot/cold air/air heat pump system 9 to communicate with the household computer communication network 12.

In a preferred embodiment, the electric household appliances 8 and the indoor units 11 of the hot/cold air/air heat pump system 9 are Wi-Fi-enabled, namely they expose Wi-Fi connectivity, and, consequently, the household computer communication network 12 is a WLAN or mixed LAN/WLAN network. Electric household appliances 8 and the indoor units 11 of new generation hot/cold air/air heat pump systems 9 natively expose Wi-Fi connectivity, so they can be used without requiring any intervention whatsoever, while electric household appliances 8 and indoor units 11 of the hot/cold air/air heat pump system 9 which do not natively expose Wi-Fi connectivity, they need to be provided with appropriate Wi-Fi interfaces.

The electronic control system 1 comprises an electronic control unit 14, conveniently in the form of a Programmable Logic (micro-)Controller (PLC), and provided with a user programming interface 15 comprising a display and a keypad or a touch-sensitive display.

The electronic control unit 14 is configured to communicate with the electronic electrical power meter 5, the electric household appliances 8, and the indoor units 11 of the hot/cold air/air heat pump system 9 via the household computer communication network 12. A proprietary management software is installed on the electronic control unit 14 to manage operation of the electric household appliances 8 and of the internal units 11 of the hot/cold air/air heat pump system 9 and designed to optimize, when executed, the exploitation of the electrical power produced by the household photovoltaic system 2 to electrically power the electric household appliances 8 and the indoor units 11 of the hot/cold air/air heat pump system 9.

In addition to being electrically powered by the electrical power produced by the household photovoltaic system 2 or absorbed from the public electrical power mains 3, the electric household appliances 8 and the indoor units 11 of the hot/cold air/air heat pump system 9 are also in communication with the electronic control unit 14 via the household computer communication network 12, so that operation thereof can be electronically controlled by the electronic control unit 14 by sending operation enabling commands generated according to the proprietary logics described in detail in the following, and, in response to the receipt thereof, the electric household appliances 8 and the internal units 11 of the hot/cold air/air heat pump system 9 can perform respective operating cycles (washing laundry for washing machines, washing dishes for dishwashers, etc.) according to the specifics operating programs selected by the users, for example the specific washing programs selected for washing machines and dishwashers, the specific drying programs selected for the dryers, the specific cooking programs selected for electric ovens, etc.

The management software installed in the electronic control unit 14 is designed to display on a display of the user programming interface 15, when executed, a Graphical User Interface (GUI) via which users can interact with the electric household appliances 8 and the indoor units 11 of the hot/cold air/air heat pump system 9 to manually control operation and to program automatic operation thereof, as described in greater detail in the following.

In particular, the management software is designed to implement a proprietary management strategy to manage exploitation of electrical power produced by the household photovoltaic system 2 to electrically power the electric household appliances 8 and the indoor units 11 of the hot/cold air/air heat pump system 9.

The management strategy is particularly adapted for household environments where the occupants are usually away from home for all or part of the day and, therefore, the electric household appliances 8 may not be operated when an excess of electrical power produced by the household photovoltaic system 2 over the electrical power consumption of the household electric loads 6 of the household electric system 4 is available.

The management strategy is the result of a dual-sided observation that the household photovoltaic system 2 has an average electrical power production curve that increases from the morning to a maximum between 12 am and 1 pm, then decreases up to zero at sunset, and that the excess of electrical power produced by the household photovoltaic system 2 over the electrical power consumption of the household electric loads 6 of the household electric system 4 is supplied to the public electrical power mains 3 at a price which is currently very low and is currently about four to six times lower than the gross purchase price paid by users to the electricity companies that produce or sell electrical power.

With regard to the exploitation of the electrical power produced by the household photovoltaic system 2 to electrically power the indoor unit 11 of the hot/cold air/air heat pump system 9, the management software is designed to implement the management strategy disclosed in the Italian patent application No. 102016000127654 filed by the Applicant on Dec. 16, 2017, the content of which is to be considered herein entirely incorporated by reference.

Instead, as regards the exploitation of the electrical power produced by the household photovoltaic system 2 to electrically power the electric household appliances 8, the management software is designed to implement the management strategy described in the following.

In particular, the management software is designed to store a plurality of available user-selectable operating modes of the electric household appliances 8 and described in detail in the following, and to expose a Graphical User Interface (GUI) via which users can:

input a list of electric household appliances 8 connected to the household electric system 4 to be remotely controlled and to specify the main electrical and operating characteristics of the electric household appliances 8, in particular their electrical power consumption, the (maximum) durations of their operating cycles, for example of those most frequently used, etc., and program operation of each of the electric household appliances 8 in the list by making selections according to a prioritized order, and in particular:

program operation priorities of the electric household appliances 8, so as to define a timeline of operation of the electric household appliances 8, for example first the washing machine(s), then the dryer(s), the dishwasher(s), the electric oven(s), etc., program a general operating mode for each of the electric household appliances 8 and selectable from:

a general manual operating mode, in which electric household appliances 8 are operated by the user, and a general automatic operating mode, in which the electric household appliances 8 are operated by the electronic control unit 14, if an automatic general operating mode is programmed, program an automatic specific operating mode for each of the electric household appliances 8 and selectable from:

one or different "Programmable" automatic operating modes aimed at prioritizing the completion of the operating cycles of the electric household appliances 8 within programmable completion times with respect to the electric power saving for the execution of the operating cycles of the electric household appliances 8, and one or different "Power Saving" automatic operating modes aimed at prioritizing the electric power saving for the execution of the operating cycles of the electric household appliances 8, without putting any time constraints on the completion of the operating cycles, and for the "Programmable" automatic operating modes, program the completion times of the operating cycles of the electric household appliances 8.

As a non-limiting example, the "Programmable" automatic operating modes may comprise:

a "Lunch" automatic operating mode designed to cause the operating cycles of the electric household appliances 8 to be completed within a programmable lunch time, "Dinner" automatic operating mode designed to cause the operating cycles of the electric household appliances 8 to be completed within a programmable dinner time, and a "Programmable" automatic operating mode designed to cause the operating cycles of the electric household appliances 8 to be completed within any programmable times, different from that of the meals as they are already covered by the two previous automatic operating modes.

In particular, the "Power Saving" automatic operating modes are designed to cause, when implemented, the electric household appliances 8, for which these automatic operating modes have been programmed, to start their respective operating cycles only when the excess of electrical power produced by the household photovoltaic system 2 over the electrical power consumption of the household electric loads 6 of the household electric system 4 is enough to allow the electric household appliances 8 to start the respective operating cycles, which, if not interruptible, are in any case completed even if it is necessary to absorb electrical power from the public electrical power mains 3 due to a reduction in the energy production of the household photovoltaic system 2 after the operating cycles have started. In the event that the operating cycles of the electric household appliances 8 are interruptible, users can be put in a position to program whether the operating cycles are to be interrupted or completed in the event that it is necessary to absorb electrical power from the public electrical power mains 3.

The "Programmable" automatic operating modes, on the contrary, are designed to cause, when implemented, the electric household appliances 8 for which these automatic operating modes have been programmed, to complete the respective operating cycles within the scheduled completion times, preferably, but not necessarily, by exploiting the excess of electrical power produced by the household photovoltaic system 2 over the electrical power consumption of the household electric system 4, to the point that, should the electrical power production of the household photovoltaic system 2 never become enough to allow electric household appliances 8 to carry out their respective operating cycles by exploiting only the excess of electrical power produced by the household photovoltaic system 2 over the electrical power consumption of the household electric system 4, the electric household appliances 8 are operated, at a certain point, so as to cause the respective operating cycles to be completed within the scheduled completion times by absorbing the required electrical power from the public electrical power mains 3.

Moreover, in the "Programmable" and "Power Saving" automatic operating modes, should the excess of electrical power produced by the household photovoltaic system 2 over the electrical power consumption of the household electric system 4 decrease during the execution of the operating cycles of the electric household appliances 8 to such an extent as to become insufficient to allow the operating cycles to be completed, these are in any case brought to completion by absorbing the required electrical power from the public electrical power mains 3.

Moreover, in the "Programmable" automatic operating modes, should the excess of electrical power produced by the household photovoltaic system 2 over the electrical power consumption of the electric utility systems 6 of the household electric system 4 never become enough to allow the operating cycles of the electric household appliances 8 to be completed within the scheduled completion times by exploiting only the excess of electrical power, the electric household appliances 8 are operated in advance to the respective scheduled activation times of time advances equal to the (maximum) durations of the respective operating cycles, so as to cause the respective operating cycles to be completed within the scheduled completion times.

The management software is therefore designed to:

store the selections of the operating modes and the time schedules made by the users, implement an electrical power analyser to constantly determine the amount of electrical power produced by the household photovoltaic system 2 and the electrical power consumption of the household electric system 4 and, based thereon, the excess of electrical power produced by the household photovoltaic system 2 over the electrical power consumption of the household electric loads 6 of the household electric system 4, and which, for this reason, would be supplied to the public electrical power mains 3 at very low cost, identify the electric household appliances 8 for which automatic operating modes have been programmed, and enable operation of those electric household appliances 8 for which automatic operating modes have been programmed based on the programmed operating priorities and on the corresponding programmed automatic operating modes.

As previously mentioned, enabling the operation of the electric household appliances 8 comprises the transmission to the electric household appliances 8, via the household computer communication network 12 and the respective network interfaces 13, of operation enabling commands, which will responsively cause the electric household appliances 8 to operate according to the specific operating programs selected for the individual electric household appliances 8.

In this way, those electric household appliances 8 for which the "Programmable" automatic operating modes have been programmed will carry out their respective operating cycles within the scheduled completion times, regardless of whether there is an excess of electrical power produced by the household photovoltaic system 2 over the electrical power consumption of the household electric loads 6 of the household electric system 4 and the excess of electrical power is enough to allow the electric household appliances 8 to complete the respective operating cycles, while those electric household appliances 8, for which the "Power Saving" automatic operating modes have been programmed will start the respective operating cycles only when the excess of electrical power produced by the household photovoltaic system 2 over the electrical power consumption of the household electric loads 6 of the household electric system 4 is enough to allow the electric household appliances 8 to start the respective operating cycles.

Therefore, if, as usually happens on a sunny day, the excess of electrical power produced by the household photovoltaic system 2 over the electrical power consumption of the household electric loads 6 of the household electric system 4 increases during the day, then the management software causes the excess of electrical power, instead of being supplied to the public electrical power mains 3 at very low costs, to be used by the electric household appliances 8 to carry out the respective operating cycles according to the programmed automatic operating modes.

In any case, should the excess of electrical power produced by the photovoltaic system 2 over the electrical power consumption of the household electric loads 6 of the household electric system 4 not only fail to grow but even decrease during the day, due to, for example, a progressive cloud overcast or the approaching sunset, down to zero or even becoming negative, the management software controls operation of the electric household appliances 8 in order to maximize the exploitation of the electrical power produced by the household photovoltaic system 2 to electrical power the electric household appliances 8, thereby minimizing the absorption of electrical power from the public electrical power mains 3.

Finally, it is possible to provide a web version that allows the control electronic control unit 14 to be remotely accessed by means of a user terminal, such as a smartphone, a tablet or a personal computer, and via an Internet connection, in order to display the same information and carry out the same settings and programming as those that can be displayed and carried out via the graphical user interface displayed on the user interface 15 of the electronic control unit 14. In particular, the web version is particularly advantageous when, in case of needing to return home ahead of schedule, it is necessary to change the programmed automatic operating mode or the programmed times in the "Programmable" operating modes.

The invention claimed is:

1. An electronic control system (1) to control exploitation of electrical power produced by a household photovoltaic system (2) to electrically power supply remotely electronically-controllable household appliances (8);
   the household photovoltaic system (2) is electrically connected to a public electrical power mains (3) and to a household electric system (4) through an electronic electrical power meter (5) configured to measure the electrical power produced by the household photovoltaic system (2) and the electrical power absorbed from or supplied to the public electrical power mains (3) as a result of an electric power underproduction or overproduction by the household photovoltaic system (2) compared to the electrical power consumption of the household electric system (4);
   the electronic control system (1) comprises an electronic control unit (14) provided with a programming user interface (15) and configured to communicate with the electronic electrical power meter (5) to determine an excess of electrical power produced by the photovoltaic system (2) over the electrical power consumption of the household electric system (4), and with the electric household appliances (8) to remotely control operation thereof based on the excess of electrical power produced by the photovoltaic system (2) over the electric power consumption of the household electric system (4), on programmed operation priorities, and on programmed automatic operating modes;
   the electronic control unit (14) is further configured to store a plurality of user-selectable operating modes of the electric household appliances (8) and to allow the following programming of the operation of the electronic control unit (14) to be performed via the programming user interface (15):
      inputting a list of electric household appliances (8) to be remotely controlled, and information indicative of the electrical and operating characteristics of the electric household appliances (8) comprising electric power consumption and durations of the operating cycles;
      programming operation priorities of the electronic household appliance (8) to define a timeline of operation of electric household appliances (8),
      programming a specific automatic operating mode for each of the electric household appliances (8) and selectable from:
         one or different first automatic operating modes aimed at prioritizing completion of the operating cycles of the electric household appliances (8) within programmable completion times with respect to the exploitation of electrical power produced by the household photovoltaic system (2) for the execution of the operating cycles of the electric household appliances (8), and
         one or different second automatic operating modes aimed at prioritizing exploitation of the electrical power produced by the household photovoltaic system (2) for the execution of the operating cycles of the electric household appliances (8) with respect to the completion of the operating cycles of the electric household appliances (8) within programmable completion times.

2. The electronic control system (1) of claim 1, wherein the first automatic operating modes comprise:
   an automatic operating mode designed to cause the operating cycles of the electric household appliances (8) to be completed within a programmable lunch time,
   an automatic operating mode designed to cause the operating cycles of the electric household appliances (8) to be completed within a programmable dinner time, and
   an automatic operating mode designed to cause the operating cycles of the electric household appliances (8) to be completed within a programmable time.

3. The electronic control system (1) of claim 1, wherein the programming user interface (15) is further designed to allow a general operating mode to be programmed for each of the electric household appliances (8) and selectable from:
   a general manual operating mode, in which the electric household appliances (8) are operated by a user, and
   an automatic general operating mode, in which the electric household appliances (8) are operated by the electronic control unit (14).

4. The electronic control system (1) of claim 1, wherein the second automatic operating modes are designed to cause, when implemented, the electric household appliances (8) for which these automatic operating modes have been programmed, to start the respective operating cycles only when an excess of electrical power produced by the household photovoltaic system (2) over the electric power consumption of the household electric system (4) is enough to allow the electric household appliances (8) to start their respective operating cycles.

5. The electronic control system (1) of claim 1, wherein the first automatic operating modes are designed to cause, when implemented, the electric household appliances (8) for which these automatic operating modes have been programmed to complete the respective operating cycles within the programmed times, preferably, but not necessarily, by exploiting the excess of electrical power produced by the household photovoltaic system (2) over the electric power consumption of the household electric system (4), to the point that, should the electrical power produced by the household photovoltaic system (2) be not enough to allow the electric household appliances (8) to carry out the respective operating cycles using only the excess of electrical power, the electric household appliances (8) are still operated so as to complete the respective operating cycles within the programmed times even absorbing the required electrical power from the public electrical power mains (3).

6. The electronic control system (1) according to claim 5, wherein the first and second automatic operating modes are further designed to cause, should the excess of electrical power produced by the household photovoltaic system (2) over the electric power consumption of the household electric system (4) reduce during the execution of the operating cycles of the electric household appliances (8) to such an extent as to become insufficient to allow the operating cycles to be completed, the operating cycles to be completed by absorbing the required electrical power from the public electrical power mains (3).

7. The electronic control system (1) of claim 1, wherein the electric household appliances (8) expose Wi-Fi connectivity to communicate with the electronic control unit (14) via a wireless local area network (12).

8. A non-transitory computer readable medium containing computer instructions that, when executed or interpreted by a processor, cause the electronic control unit (14) to become programmed as claimed in claim 1.

* * * * *